United States Patent [19]

Fleming

[11] Patent Number: 4,988,137
[45] Date of Patent: Jan. 29, 1991

[54] VEHICLE BUMPER ASSEMBLY WITH FOAMED CORE

[76] Inventor: Stephen D. Fleming, 52 Lower Lambricks, Rayleigh, United Kingdom

[21] Appl. No.: 858,486

[22] Filed: Apr. 30, 1986

[30] Foreign Application Priority Data

May 2, 1985 [GB] United Kingdom ............... 8511191

[51] Int. Cl.⁵ .................................... B60R 19/08
[52] U.S. Cl. ..................................... 293/109; 293/120
[58] Field of Search ............... 293/102, 109, 120, 121, 293/122, 126; 264/46.8; 425/412, 414

[56] References Cited

U.S. PATENT DOCUMENTS

| | | | |
|---|---|---|---|
| 3,666,310 | 5/1972 | Burgess | 293/110 |
| 3,802,727 | 4/1974 | Beckley | 293/120 |
| 3,860,279 | 1/1975 | Hulten | 293/120 |
| 4,109,951 | 8/1978 | Weller | 293/155 X |
| 4,134,610 | 1/1979 | Lindewall | 293/120 |
| 4,266,921 | 5/1981 | Murray | 425/412 X |
| 4,350,378 | 9/1982 | Wakamatsu | 293/120 |
| 4,477,504 | 10/1984 | Bailey et al. | 264/46.8 X |
| 4,509,782 | 4/1985 | Manning | 293/109 X |
| 4,598,001 | 7/1986 | Watanabe et al. | 293/120 X |

FOREIGN PATENT DOCUMENTS

| | | |
|---|---|---|
| 2055446 | 6/1983 | United Kingdom . |
| 2071583 | 8/1983 | United Kingdom . |
| 2118489 | 11/1983 | United Kingdom . |
| 2120158 | 11/1983 | United Kingdom . |

Primary Examiner—Russell D. Stormer
Attorney, Agent, or Firm—Peter D. McDermott; Roger L. May

[57] ABSTRACT

A vehicle bumper assembly comprises a channel-section outer shell (12) of injection moulded plastics material extending transversely across the front or rear (20) of a motor vehicle and having spaced apart brackets (32) for mounting the bumper on the motor vehicle. The outer shell (12) is substantially filled with an energy absorbing foam (24) adhered to the inside of the outer shell (12) and the mounting brackets (32) have arm portions (36) moulded in the foam filling (24).

7 Claims, 3 Drawing Sheets

VEHICLE BUMPER ASSEMBLY WITH FOAMED CORE

This invention relates to a bumper assembly of plastics material for a motor vehicle.

A known form of vehicle bumper of plastics material is shown in our UK Pat. Specification No. GB 2 118 489 A. This comprises a box structure formed from an injection molded channel section outer member friction welded to a backing plate injection molded from the same material. This structure has been used on the Ford Sierra vehicle and allows considerable styling freedom together with sufficient strength and energy absorbing characteristics to meet the applicable European regulations. However, a sufficient thickness of material must be used to avoid droop when a vehicle fitted with the bumper is put though a paint oven and to provide adequate strength for the bumper to survive low speed collisions without damage.

The improved bumper structure of the present invention allows a reduced thickness of plastics shell and obviates the need for an injection moulded backing member without loss of energy absorbing and damagability characteristics. By reducing the amount of shell material required, the cost and weight of the bumper is reduced.

According to the present invention we provide a vehicle bumper assembly comprising a channel-section outer shell of injection molded plastics material for extending transversely across the front or rear of a motor vehicle and having integral end portions for extending along the sides of the motor vehicle, and spaced apart brackets for mounting the bumper on the motor vehicle, characterised in that:

a. the transversely extending portion of the outer shell is substantially filled with an energy absorbing foam adhered to the inside of the outer shell; and b. the mounting brackets have arm portions moulded into the foam filling.

The invention will now be described with reference to the accompanying drawings, in which.

Figure 1:
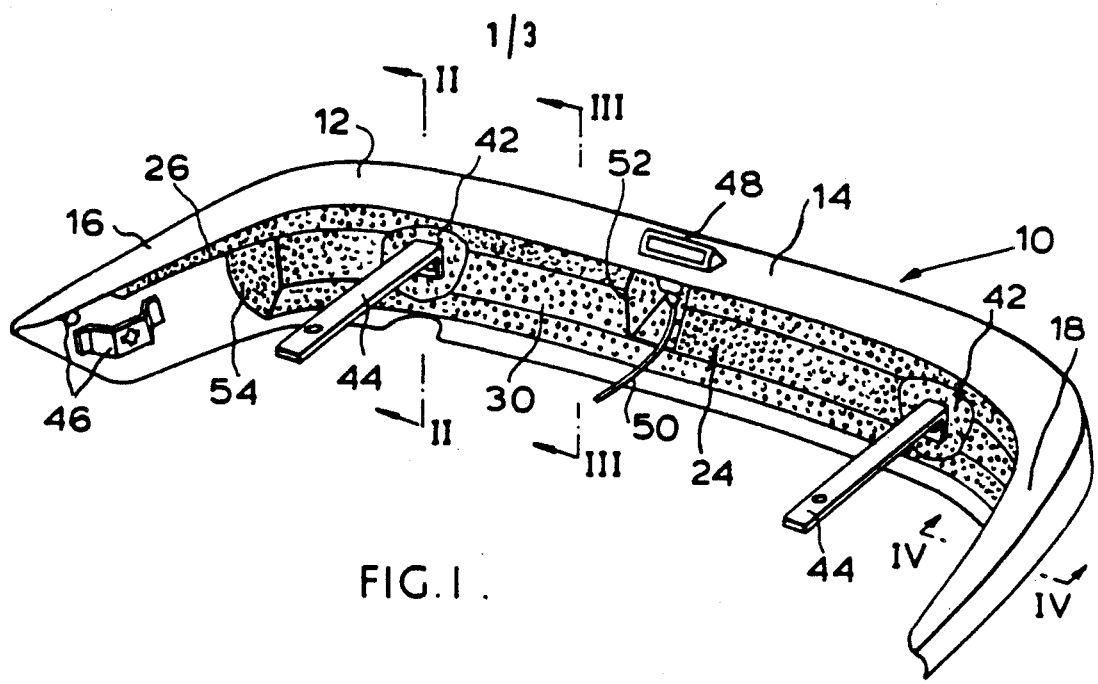
FIG. 1 is a perspective diagrammatic view from above of a motor vehicle rear bumper embodying the invention.
Figure 2:
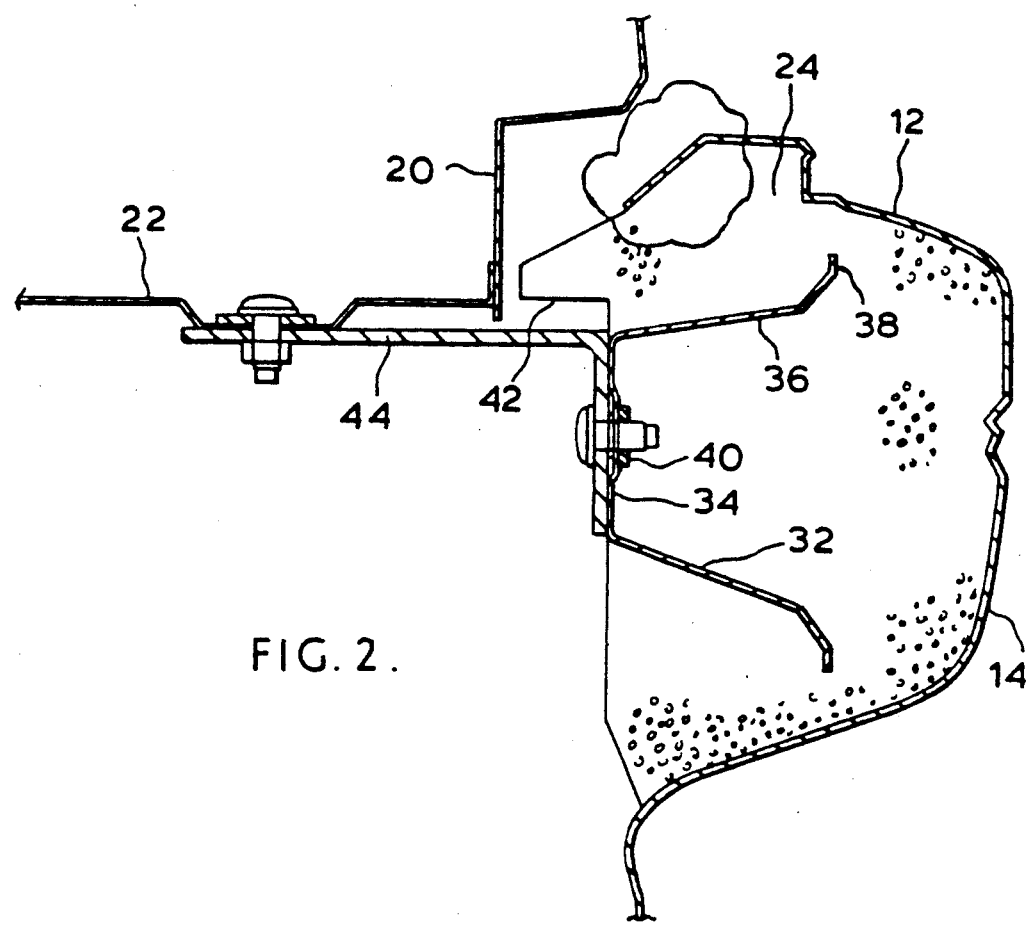
FIG. 2 is a section along the line II—II of FIG. 1 showing the bumper mounted on the vehicle.
Figure 3:
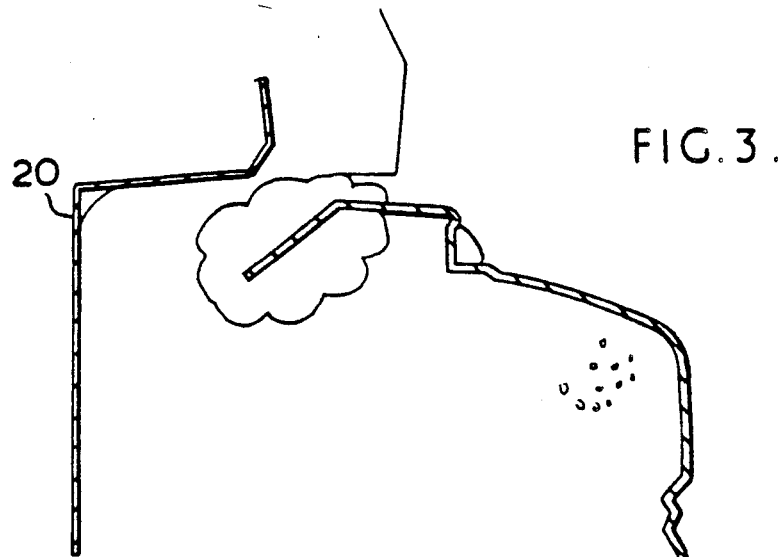
FIG. 3 is a section along the line III—III of FIG. 1.
Figure 4:
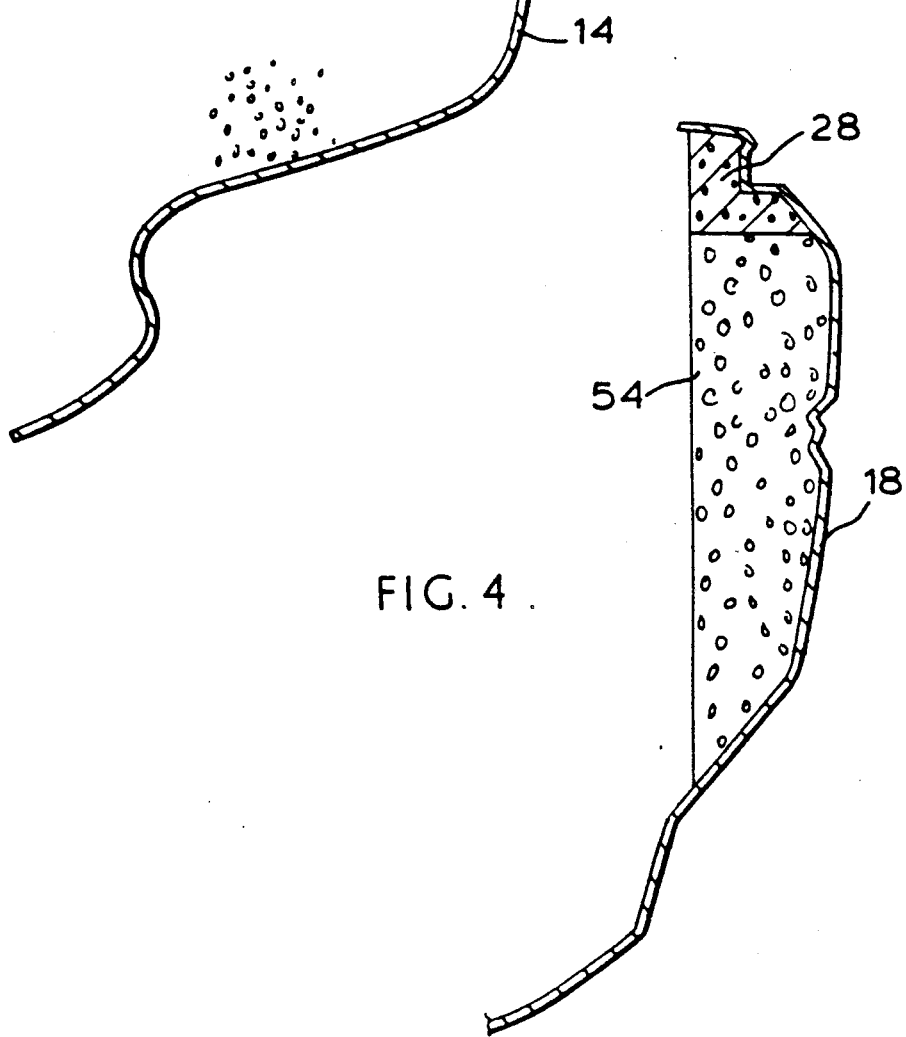
FIG. 4 is a section along the line IV—IV of FIG. 1.

A vehicle rear bumper assembly 10 embodying the invention comprises an outer shell 12 of injection molded polycarbonate plastics material. The shell 12 is of generally channel section with a transversely extending main run 14 with integrally molded end portions 16 and 18 each of which extends along a respective side of the vehicle (of which only parts of the rear cross-member 20 and longitudinal frame member 22 are shown in FIGS. 2 and 3).

The outer shell 12 is supported and strengthened by a foam filling 24 formed in situ in the main run 14 of the shell 12 with forwardly extending runners 26 and 28 which underlie and support the upper surfaces of end portions 16 and 18. The forward surface 30 of the foam filling 24 is shaped to follow closely the rear face of the vehicle rear cross-member 20 as shown in FIG. 3.

Figure 5:
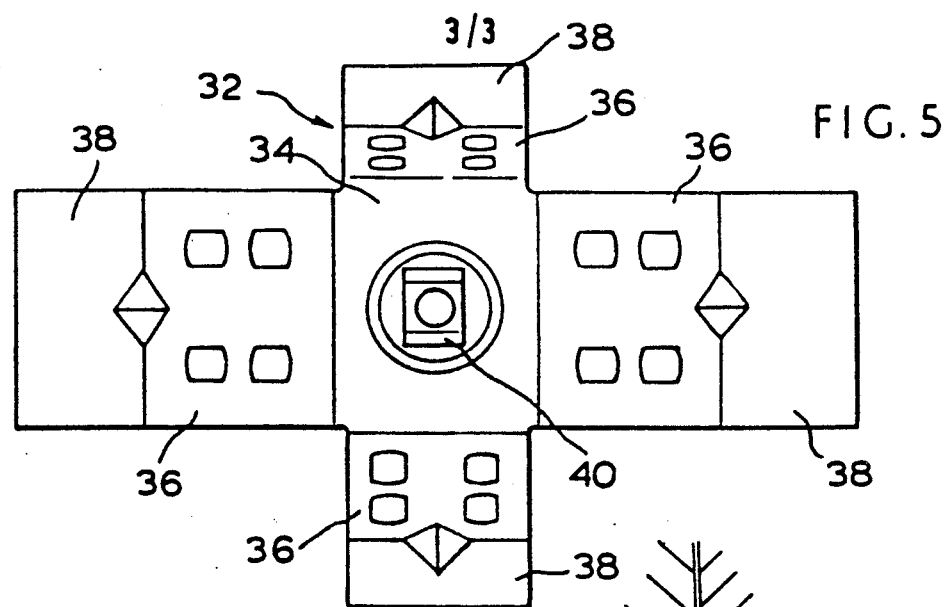
FIG. 5 is a view of the mounting bracket in the direction of arrow V in FIG. 2.

A pair of sheet metal mounting brackets 32 (FIGS. 2 and 5) are molded into the foam filling 24, one adjacent each end of the main run 14. Each bracket 32 comprises a mounting area 34 lying substantially coplanar with the outer surface of the foam filling and four apertured arms 36 extending into the foam filling. Each arm 36 is apertured as shown in FIG. 5 and hooked outwardly at its outer end 38 to provide an extensive contact area with the foam filling. Adhesion of the foam to the brackets 32 and the key provided by their shape ensures good retention of the brackets in the foam filling over the lifetime of the bumper.

A nut 40 is fixed to each mounting area 34. Recesses 42 in the surface of the foam filling provide access to the mounting areas 34. Bumper support arms 44 are bolted at their rear ends to a respective mounting area 34 and to the rear end of a respective longitudinal frame member 22. The forward ends of the end portions 16 and 18 are supported on the vehicle rear fenders by fastening means 46 described fully in our UK Pat. Application No. GB 2 118 489 A.

A number plate illumination lamp 48 is fixed in an aperture in the upper surface of the main run 14. Access to the lamp 48 and its wiring 50 is provided by a recess 52 in the foam filling part of which is undercut by water jet after the foam filling has been formed.

Impact absorption requirements for the end portions 16 and 18 can be met without a full foam filling. The filling is carried round the corners of the bumper up to surfaces 54. The runners 26 and 28 line only the upper part of the end portions 16 and 18 to support the upper surfaces against any tendency to sag when the vehicle is put through a paint oven.

Figure 6:
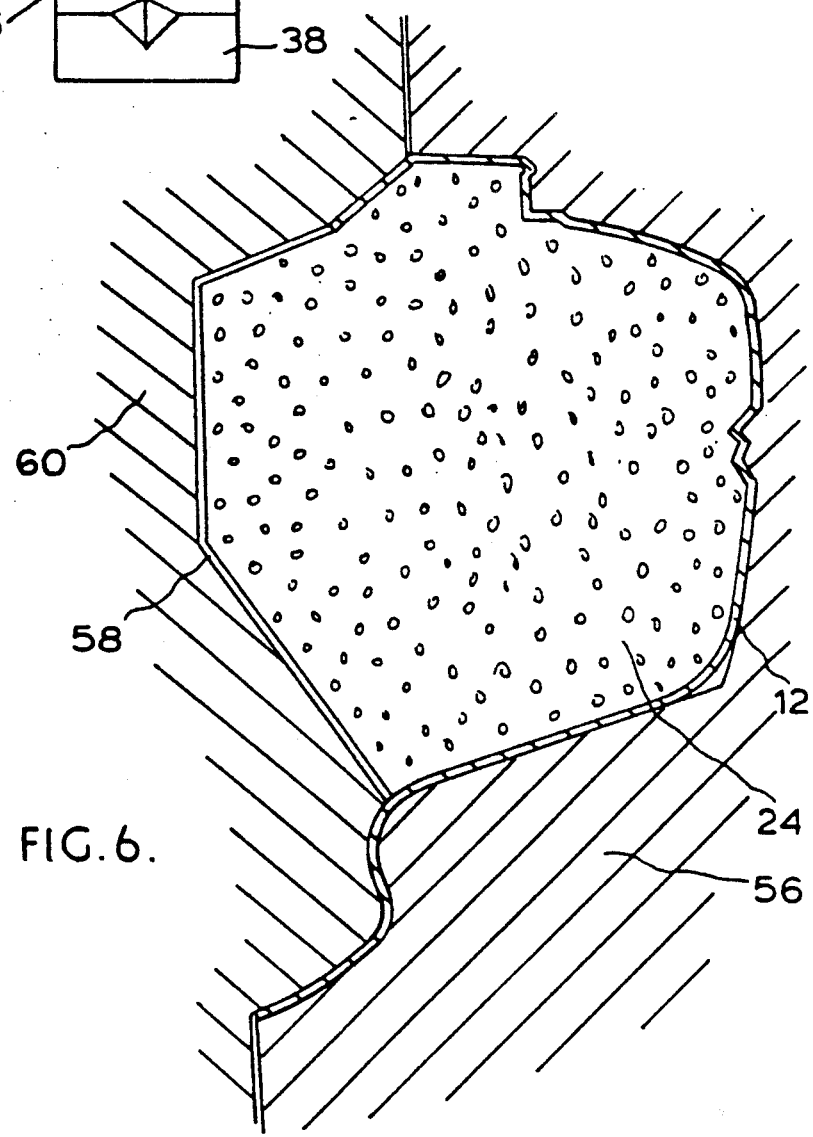
FIG. 6 is a section of the bumper assembly in a molding tool immediately after the foaming process, the section being taken through the same part of the bumper as the section of FIG. 2.

A method of making the bumper of the invention is illustrated in FIG. 6. The outer shell is placed in one part 56 of a molding tool. A vacuum formed polypropylene liner 58 is held in place on the other part 60 of the moulding tool by vacuum. The liner 58 and contacting face of the tool have the shape required for the outer surface of the foam filling 24. A two component polyurethane foam material made by mixing a polyol and an isocyanate is introduced into the mold and allowed to react and foam to filled the mold cavity. After partial curing the bumper is removed from the mold and left to finish curing with the liner 58 over the outer surface of the foam. When the foam is sufficiently stable the liner is removed and reused in subsequent foaming operations.

The foam material is selected for energy absorbing properties and for good adhesion to the polycarbonate shell and to the metal of the mounting brackets. The liner 58 prevents adhesion of the foam to the mold without requiring the use of liquid release agents which have to cleaned off the finished bumper and can cause paint adhesion problems during later finishing processes.

The vehicle bumper described makes effective use of the energy absorbing properties of the foam because, in the event of an impact the foam filling is crushed between the vehicle cross-member 20 and the outer shell 24. The bumper need not have great beam strength because the main run is supported against bending in the event of an impact between the supporting brackets by contact of the foam filling with the vehicle cross-member.

The same structure may be used also for a vehicle front bumper.

I claim:

1. A method of making a vehicle bumper assembly comprising a channel-section outer shell of injection molded plastics material for extending transversely across the front or rear of a motor vehicle and having integral end portions for extending along the sides of the motor vehicle, and spaced apart mounting brackets for mounting the bumper on the motor vehicle, wherein a transversely extending portion of the outer shell is substantially filled with an energy absorbing foam adhered to the inside of the outer shell; and the mounting brackets have arm portions molded into said foam, said method being characterized in that:

a. the outer shell is mounted in one part of a molding tool so that an inner surface portion thereof to be adhered to said foam forms a wall of the molding cavity of the tool;
   b. the mounting brackets are mounted on a second part of the tool; and
   c. the tool is closed and a foamable plastics material is injected to form a filling of said foam therein.

2. A method of making a vehicle bumper assembly as claimed in claim 1, characterized in that a liner of material which has low adhesion to the foam is laid over said second part of the tool prior to injecting said plastics material 3. A method of making a vehicle bumper assembly as claimed in claim 2, characterized in that the liner is held in place in the tool by vacuum.

4. A method of making a vehicle bumper assembly as claimed in claim 2, characterized in that the liner is left in place after the bumper is ejected from the mold until the foam has cured.

5. A method of making a vehicle bumper assembly as claimed in claim 2 characterized in that the liner is a vacuum formed sheet of polypropylene.

6. A method of making a vehicle bumper assembly as claimed in claim 1, characterized in that the outer shell is injection molded polycarbonate plastics material and said foamable plastics material is a two component polyurethane foam material.

7. A vehicle bumper assembly comprising a channel-section outer shell of injected molded plastics material for extending transversely across the front or rear of a motor vehicle and having integral end portions for extending along the sides of the motor vehicle, and spaced apart mounting brackets for mounting the bumper on the motor vehicle, wherein a transversely extending portion of the outer shell is substantially filled with an energy absorbing foam adhered to the inside of the outer shell; and the mounting brackets have apertured arm portions spaced apart from the outer shell and molded into said foam, and the mounting brackets having support portions extending from the foam for directly attaching the bumper to the motor vehicle, made by the method of:

a. mounting the outer shell in one part of a molding tool so that an inner surface portion thereof to be adhered to said foam forms a wall of the molding cavity of the tool;
   b. mounting the mounting brackets on a second part of the tool; and
   c. closing the tool and injecting a foamable plastics material to form a filling of said foam therein.

* * * * *

UNITED STATES PATENT AND TRADEMARK OFFICE
CERTIFICATE OF CORRECTION

PATENT NO. : 4,988,137

DATED : January 29, 1991

INVENTOR(S) : Stephen D. Fleming

It is certified that error appears in the above-identified patent and that said Letters Patent is hereby corrected as shown below:

On the cover page add:

-- Assignee: Ford Motor Company, Dearborn, Michigan -- .

Signed and Sealed this

Twenty-third Day of June, 1992

Attest:

DOUGLAS B. COMER

*Attesting Officer*   *Acting Commissioner of Patents and Trademarks*